United States Patent [19]

Ebrahim

[11] Patent Number: 5,970,505
[45] Date of Patent: Oct. 19, 1999

[54] LINKING RELATED DATA IN A DOCUMENT SET INCLUDING A PLURALITY OF BOOKS WRITTEN BY DIFFERENT GROUPS OF AUTHORS IN A COMPUTER NETWORK

[75] Inventor: Zahir Ebrahim, Mountain View, Calif.

[73] Assignee: Sun Mirosystems, Inc., Mountain View, Calif.

[21] Appl. No.: 08/829,757

[22] Filed: Mar. 31, 1997

[51] Int. Cl.$^6$ .................................................. G06F 17/30

[52] U.S. Cl. .......................... 707/501; 707/104; 707/513; 707/532; 707/537

[58] Field of Search .................................. 707/101, 102, 707/103, 104, 501, 511, 513, 514, 532, 537, 907, 10; 345/331, 329; 704/10; 395/200.48, 200.49

[56] References Cited

U.S. PATENT DOCUMENTS

| | | | |
|---|---|---|---|
| 5,283,864 | 2/1994 | Knowlton | 345/350 |
| 5,388,196 | 2/1995 | Pajak et al. | 345/329 |
| 5,655,130 | 8/1997 | Dodge et al. | 707/511 |
| 5,727,156 | 3/1998 | Herr-Hoyman et al. | 395/200.49 |
| 5,734,883 | 3/1998 | Umen et al. | 707/1 |
| 5,745,360 | 4/1998 | Leone et al. | 707/513 |
| 5,893,109 | 4/1999 | DeRose et al. | 707/104 |

*Primary Examiner*—Wayne Amsbury
*Assistant Examiner*—Srirama Channavajjala
*Attorney, Agent, or Firm*—Steven F. Caserza; Flehr Hohbach Test Albritton & Herbert, LLP

[57] ABSTRACT

Particularly, a system and method are disclosed that enable an author of a subsection of a document quickly to locate referenced information in other parts of the document or different documents prepared by other authors and then incorporate that information in their own document. An author tags information in their document that other authors might wish to import. Each time the document is updated, or as requested by the author, the author's tags and other tags that reference information that is importable by default (e.g., section headings, figures, tables) are exported to a tag repository that is accessible to all other authors. The tag repository also holds the tags generated by other authors from different documents. Using information finding/linking programs any of the authors can search the tag repository and select tags corresponding to information they would like to import into their own documents. The information can be imported by reference, by hypertext link, or by simple copying, among other techniques.

39 Claims, 7 Drawing Sheets

LINKING RELATED DATA IN A DOCUMENT SET INCLUDING A PLURALITY OF BOOKS WRITTEN BY DIFFERENT GROUPS OF AUTHORS IN A COMPUTER NETWORK

The present invention relates generally to document preparation systems and, particularly, to document preparation systems used to create sets of related documents.

BACKGROUND OF THE INVENTION

A document preparation project, such as writing the user manuals for the Unix operating system, can involve many authors collectively writing tens of manuals comprising thousands of pages. In such a project an author of one manual section often needs to reference or include in their section data or information from different sections and/or manuals.

In a conventional document preparation system an author needing to find such information must laboriously scan the other sections and/or manuals until they find the file that contains the desired information.

Once an author finds the desired information, they can employ one of many prior art mechanisms to incorporate the found information in the target document. For example, a hypertext link that references the desired information can be inserted into the target document that causes the linked information to be printed out whenever the target document is printed.

Today, this method is generally only possible when the link and the cross-referenced material are in the same manual. This method does not work in any commercially-available system when information needs to be accessed across multiple manuals. However, this too might also be possible given World Wide Web technology. As an alternative to automatic incorporation the author can simply copy the information into their own section.

The prior art document preparation methodology becomes unmanageably complex and inefficient when many authors from different groups and in different physical locations cooperate to write multiple manuals of a large product or project. Additional complexity is added when the documents are being written or updated concurrently, in which case the search for current or a correct version of the information to link could be never ending.

Generally, the cross-reference is limited to standard entities supported in the document preparation system, such as chapters, figures, sections, etc. An author might wish to import only a small part of another author's document that is not necessarily characterized as a standard textual unit (e.g., section, chapter, figure, table, list, etc.). For example, an author might want to import part of a phrase that specifies a value for a parameter that appears in more than one document. Using prior art mechanisms, such as tables of contents or indices, it would be difficult to provide meaningful information about such importable information that would enable the author to find it, let alone import it.

SUMMARY OF THE INVENTION

In summary, the present invention includes methods and protocols that enable efficient and seamless collaboration among multiple sets of authors of related documentation books in a documentation set wherein each book in a set written by multiple authors constitutes a single domain, and multiple of these domains consititute the documentation set such that each domain may be independently administered, be geographically dispersed, be on different computer and operating systems, and be connected by either a corporate intranet, or the public internet, networking infrastructure.

In particular, the present invention is a method for linking data in a document set including a plurality of books written by different groups of authors. The first step involves an author of a first book tagging an information unit (iunit) in that book with a tag that provides information about the iunit, including a semantic attribute and a unique identifier. The author then exports the tag to a tag repository that is accessible to all groups of authors. An author of a second book can then access the tag repository and select a tag whose corresponding information they would like to import into the second book.

The semantic information is preferably a meaningful description provided by the author of the first book that is viewable and searchable in the tag repository to enable an iunit of a desired semantic type to be selected for importation into the second book.

The tag repository can be distributed across a plurality of networked nodes. In this embodiment the exporting step comprises exporting tags for a particular book to a respective tag repository located on a predetermined node and the selecting step comprises selecting relevant tags from among all of the tag repositories.

The tag repository can also be distributed across a plurality of networked nodes running a filesystem. In this case the exporting step comprises creating a common, shared directory including the tags for all of the books and the selecting step then comprises selecting relevant tags from the common directory using utilities provided by the filesystem.

Alternatively, the tag repository can comprise a single, global tag repository stored on a single computer and accessed through network protocols such as HTTP (hypertext transfer protocol), in which case the access could be from an HTML-based browser.

In another embodiment the tag repository can be distributed across multiple computers that permit access to the tags through a variety of means, such as Web browsers, remote procedure calls (RPC) and client-server engines.

The present invention also includes systems that perform the methods and protocols described above.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

The following glossary defines terms that are used throughout the description.

| Glossary of Terms | |
| --- | --- |
| iunit | a unit of information in a Docunit that is identified by a property-value pair in the Doctags; |
| Docunit | a unit of documentation mapped to a single file; |
| Document | a collection of one or more Docunits; |
| Doc-domain | a self-contained unit of document administration with one or more authors generating one or more Documents (for the purposes of the present discussion, Docdomains are also referred to as Books; |
| Docset | a collection of one or more Docdomains |
| Doctags | a collection of one or more tags in a Docdomain that export pointers to iunits from Documents in their Docdomain to other Docdomains; |
| tagfinder | a software function that parses the Doctags database and finds a pointer to the requested information based on some user specified search function; |
| tagmaker | a software function that parses the Docunit to generate a Doctags database for that document; |
| URL | Universal Resource Locator, a file/resource address used on the Internet and intranets of the form: communications protocol. domain name. file/resource identifier). |

Figure 1:
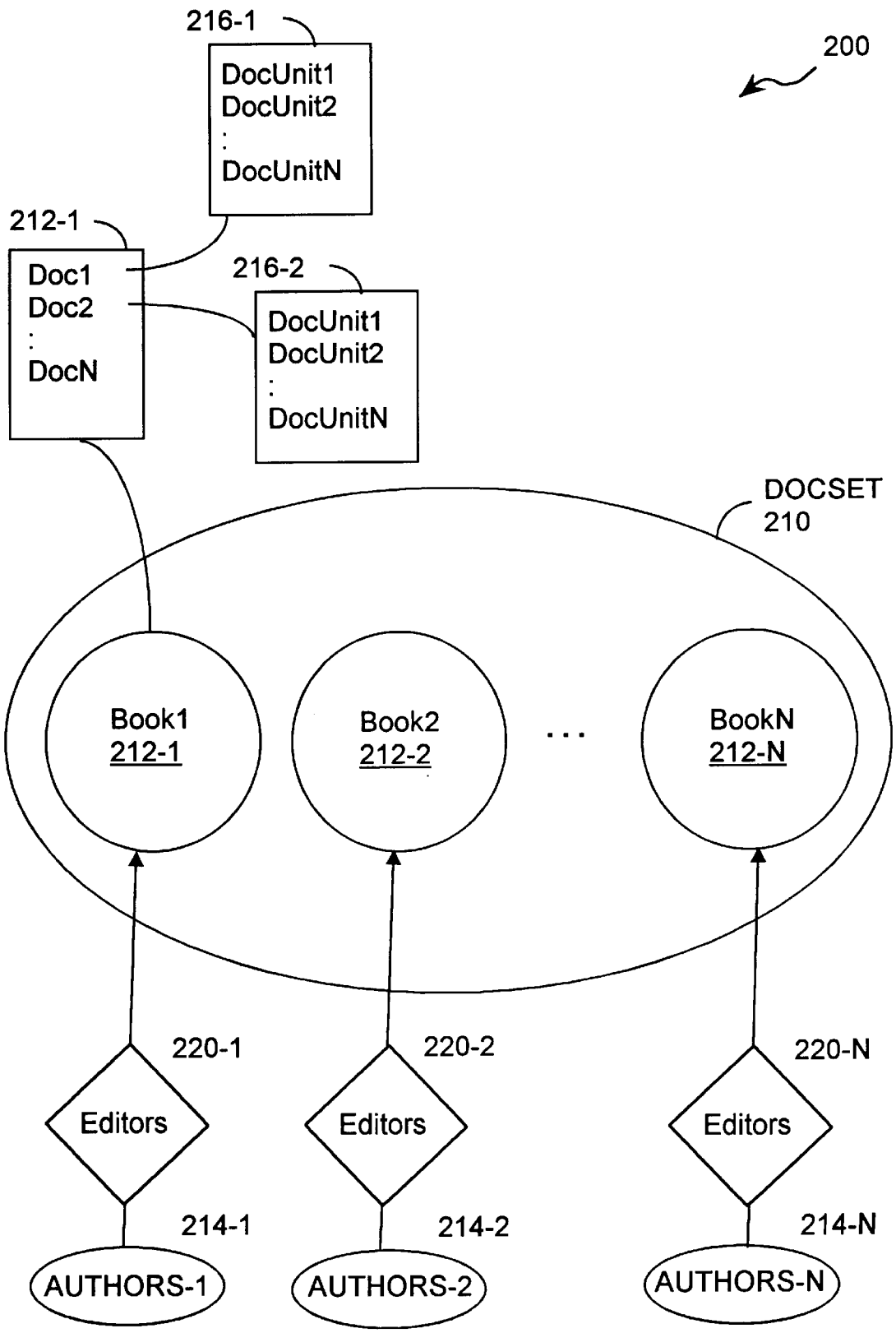
FIG. 1 is a diagram of a document preparation system in which the present invention is implemented.

Referring to FIG. 1, there is shown a depiction of a document preparation system 200 in which the present invention is implemented. The system 200 is used to prepare a document set 210 that includes one or more books 212. For example, the document set 210 could comprise the documentation for a particular computer system, in which case respective books 212 might describe the computer system's operating software, programming tools, system utilities, processor architecture and communications capabilities.

Each book 212-1, 212-2, 212-N is created and/or updated by a set of authors 214-1, 214-2, 214-N using word processors/editors 220-1, 220-2, 220-N. A book 212 comprises one or more documents 216, each of which is subdivided into one or more physical files/document units 218 (hereinafter referred to as "docunits"). A book author 214 creates or updates a book 212 by editing a docunit 218 with one of the editors 220.

An editor 220 can be any document editor/word processor (past, present or future) that has been modified in accordance with the teachings of the present invention to facilitate the linking of information between the different books 212-1, 212-2, 212-N. When the editor 220 is conventional, the computers on which the document preparation system 200 is executed must include software functions that perform at least a subset of the various information linking operations prescribed by the present invention. In such a case the software functions operate on the documents generated by the various editors 220. In the following discussions of the preferred embodiments it is assumed that the editors 220 are configured to implement at least a subset of the prescribed software functions.

In a document preparation environment 200 such as that depicted in FIG. 1 there is likely to be at least some duplication of information among at least a subset of the books 212. For example, the aforementioned docset 210 for a computer system might include books 212-1, 212-2 that describe the operating system at different levels of detail (e.g., a programmer's reference and a high-level user summary) and include common information, such as lists of operating system commands.

The present invention enables authors 214 to find and create links to information in other books 212 so that the common information need only be generated and maintained by the original set of authors 214. As a first step in the linking process authors 214 of a book 212 designate, or tag, information units (hereinafter, "iunits") within a docunit 218. After tagging, the creating authors export the tagged iunits to a tag repository, from which other authors may then import the exported tags. Following exporting, the tag repository includes pointers to the just-exported iunits in the docunit 218. The tag repository can include pointers to iunits exported from any or all of the books 212.

Authors 214 select from the repository iunits they wish to import into docunits 218 for their own books 212. The present invention enables authors to define tagged iunits at any document level (e.g., an entire docunit, a section of a document, a single word, etc.). As described in reference to FIGS. 3–5, the present invention can make the tagged iunits 222 accessible to all of the authors 214 regardless of whether the respective books 212 are stored on a single computer or distributed across a network of computers. The processing flow of the present invention that makes this possible is now described in reference to FIG. 2.

Figure 2:
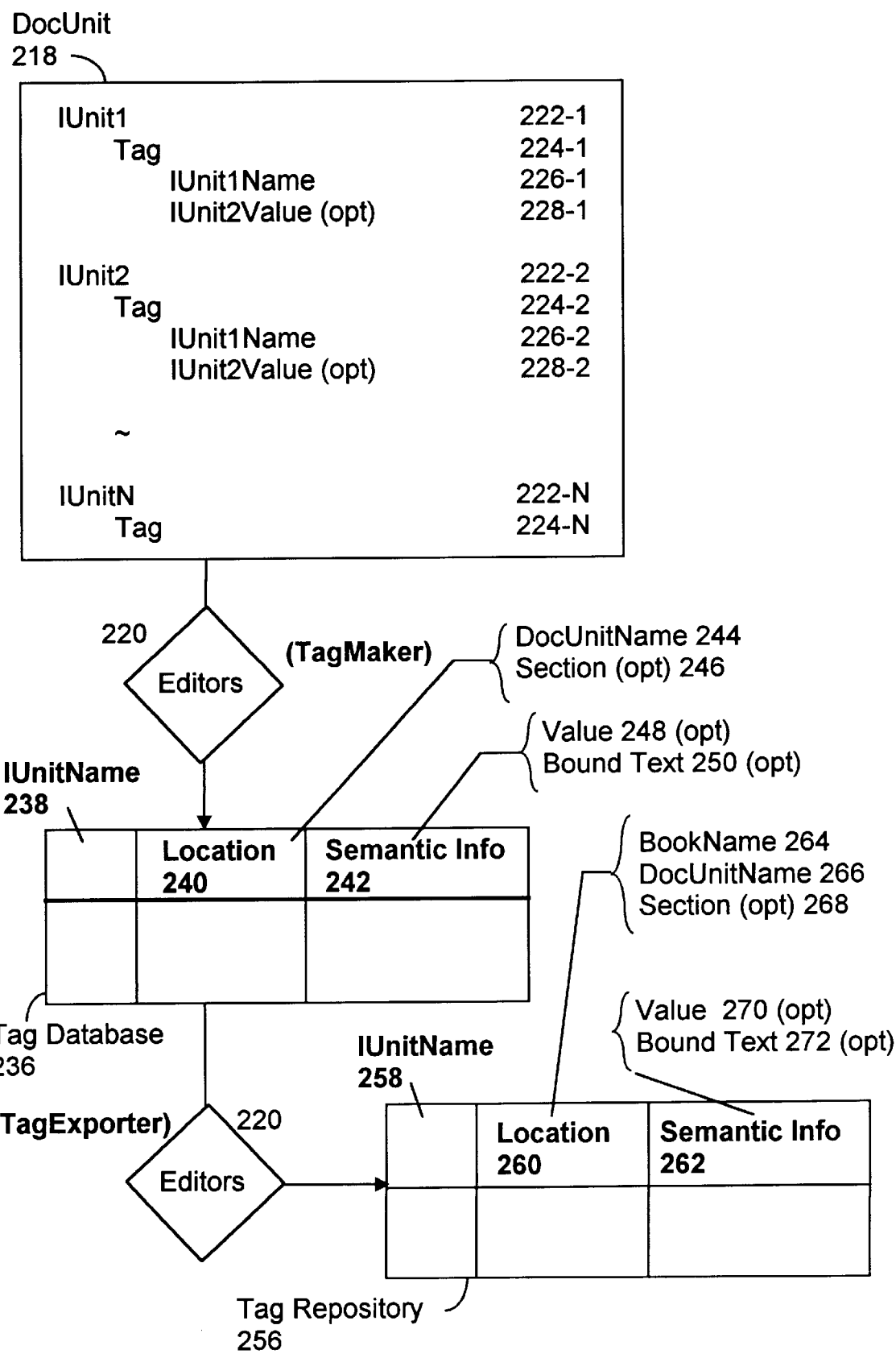
FIG. 2 is a data flow diagram illustrating the operation of a generic document unit 218 (DocUnit) of FIG. 1.

Referring to FIG. 2, there is shown a data flow diagram that illustrates how the present invention transforms tagged iunits 222 within a docunit 218 into a local tag database 236 and a tag repository 256. For the purposes of this discussion it is assumed that the generic docunit 218 includes one or more iunits 222 that have been marked for export with a respective tag 224. Each tag 224 designates the iunit name 226 and, optionally, the iunit value 228. The docunit 218 also includes other standard document elements that are not shown in FIG. 2.

For example, consider the docunit, "foo.bar", shown in Table 1:

TABLE 1

```
<group> atm_group
    <docunit> foo.bar
        <section> "Switch Weight"
            ~
            <figure> "Switch Schematic"
            ~
            <p> The weight of the matrix switch is <iutag> 10 tons
            iunit="matrix switch" value="weight" <eiutag>
            <p>
        <esection>
    <edocunit>
<egroup>
```

The docunit, "foo.bar", is a file within the "atm_switch" group/book/docdomain ("atm" is an abbreviation for asynchronous transfer mode). Table 1 represents the contents of the file, "foo.bar", in a generic markup language that is similar to GML™. The present invention is equally applicable to other types of document preparation systems, including WYSIWYG word processors, and is independent of any specific file format (e.g., the file may be an HTML file or any other type file). In Table 1 document elements (e.g., sections, figures, paragraphs) are delineated using mnemonics that are set off by matched sharp brackets "<" ">" and sometimes followed by a series of descriptors (e.g., "<section>"). Some of the mnemonics have a corresponding end mnemonic (e.g., "<esection>"). Thus, Table 1 includes a document section entitled "Switch Weight" (<section>

"Switch Weight") that includes standard elements such as a figure showing a switch schematic (<figure> "Switch Schematic") and paragraphs (set off by <p>).

The present invention enables an author to mark phrases or paragraphs for export by assigning them an export property and then giving the property an optional value. In the preferred embodiment, this is done using iunit tags. For example, the following markup from Table 1:

<p> The weight of the matrix switch is <iutag> 10 tons iunit= "matrix switch" value="weight" <eiutag> defines the export property "matrix switch", assigns it the value "weight" and binds that value to the text "10 tons". The author of the original foo.bar docunit can then choose to export information about the "matrix switch" iunit along with any other tagged iunits. Using the exported "matrix switch" iunit information, other authors of other books that need to refer to the specific switch weight defined in the foo.bar docunit can then locate that information easily via the exported "matrix switch" tag. Thus, the present invention enables a reference/tag to be created to a document element (e.g., "10 tons") that includes the necessary information to allow another author to find the element and to create a reference to it after the tag has been exported. It is described below how the iunit information from the docunit 218 is exported and selected by other authors.

Referring again to FIG. 2, in the preferred embodiment whenever a docunit 218 is updated using the editor 220, the editor 220 executes a TagMaker program that scans the docunit 218 and generates/updates the tag database 236 from all of the exportable information within the docunit 218. The exportable information includes at least a subset of the standard document elements and the iunits that were tagged for export. In the preferred embodiment, there is one tag database 236 per book 212 (FIG. 1).

The tag database 236 includes for each iunit 222 an iunit name (IUnitName) 238, iunit location information (Location) 240 and, optionally, semantic information (Semantic Info) 242. The location information 240 specifies the docunit name 244 and, optionally, the section 246 in which the corresponding iunit 222 is found. The optional semantic information 242 indicates the value 248 of the iunit 222 and the document element 250, if any, that is bound to the iunit 222. For example, Table 2 shows the tag database entry that might be generated by the TagMaker from the "matrix weight" iunit defined in Table 1.

TABLE 2 iunit = "matrix switch"
"weight" = "@byte offset into the file pointing to 10 tons, num_bytes=7"
"DocUnitName = "foo.bar"
"section" = "Switch Weight"

The first row of Table 2 indicates that this tag database entry is for the iunit, "matrix switch". The second row equates the value ("weight") of "matrix switch" with a pointer to the position in the "foo.bar" docunit/file that includes the particular occurrence of "10 tons" to which "weight" was bound and the number of bytes (7) of the referenced text. In Table 2, the pointer is shown as an unspecified offset in bytes ("@byte offset") from the beginning of the "foo.bar" file. In practice, this value would be definite. Any other pointer implementation can be used as long as it can uniquely reference the bound text. Alternatively, the referenced text can be incorporated as a string; e.g., weight="10 tons".

Note that the information in the tag database 236 can be represented in any format and that the information shown in Table 2 represents only a partial (i.e., neither maximum or minimum) set of the information that can be included in the tag database 236. For example, the tag database 236 might also indicate the book (or docdomain) 212 that encompasses the foo.bar docunit. Alternatively, if a section is not defined in the docunit 218, the section information 246 would not be included in the tag database 236.

In the preferred embodiment, the TagMaker is also configured to generate automatically tag database entries for a selectable subset of the structural elements from the docunit 218. Typically, the exportable structural elements include figures, tables, sections, chapters, etc., although other elements can also be exported. These elements are typically defined using commands provided by the editors 222. Thus, less information is needed in the tag database 236 to provide an unambiguous link to these elements. For example, Table 3 shows how the "Switch Weight" section might be referenced in the tag database 236.

TABLE 3 iunit = :section. "Switch Weight"
DocUnitName = "foo.bar"

The first line of this tag database entry identifies the iunit by its structural type (":section.") and name ("Switch Weight"). The second line indicates the name ("foo.bar") of the DocUnit that includes the iunit.

As the docunits 218 that compose a book 212 are updated and the TagMaker is executed, the tag database 236 grows to reflect all of the exportable iunits within the docunits that compose that book 212. The tag database 236 is available to all authors 214 of the book 212. However, until it has been exported to the global tag repository 256, the information in the tag database 236 cannot be referenced by the other authors 214.

In the preferred embodiment, the tag database 236 is exported by a TagExporter that is invoked from with the editors 220 or from some other program. The TagExporter exports the information in the tag database 236 to the tag repository 256.

Like the tag database 236, the tag repository 256 includes for each iunit 222 an iunit name (IUnitName) 258, location information (Location) 260 and, optionally, semantic information (Semantic Info) 262. The location information 260 specifies the book 264, docunit 266 and, optionally, the section 268 in which the corresponding iunit 222 is found. The semantic information 262 indicates the value 270 of the iunit 222 and the bound text 272, if any. For example, Table 4 shows the tag repository entry that might be exported by the editor 220 from the "matrix weight" iunit defined in Table 1.

TABLE 4 iunit = "matrix switch"
"weight" = "@byte offset into the file pointing to 10 tons, num_bytes=7"
"DocUnitName = "foo.bar"
"section" = "Switch Weight"
"DocDomain" = "atm_group"

The information in the tag repository 256 is viewable and searchable. An author 214 can find iunits to import using a TagFinder program that searches for a particular iunit (or sets of iunits) in the tag repository 256 and returns to that author the corresponding link data. Once in possession of the link data, the author 214 can import the selected iunit by reference (such as a citation), or by inclusion in a target docunit 218. It is immaterial to the present invention what particular technology is used to import an iunit into the target docunit 218.

In some situations, an author 214 may wish to import an entire docunit 218, not just an iunit 222. In this case the author can execute a DocFinder program that searches for a designated docunit(s) and returns link information for the docunit(s) in the same manner as the TagFinder.

The manner in which the tag repository 256 is implemented depends largely on the architecture of the document preparation system 200. Three different architectures and corresponding tag repository implementations are now described in reference to FIGS. 3–5.

Figure 3:
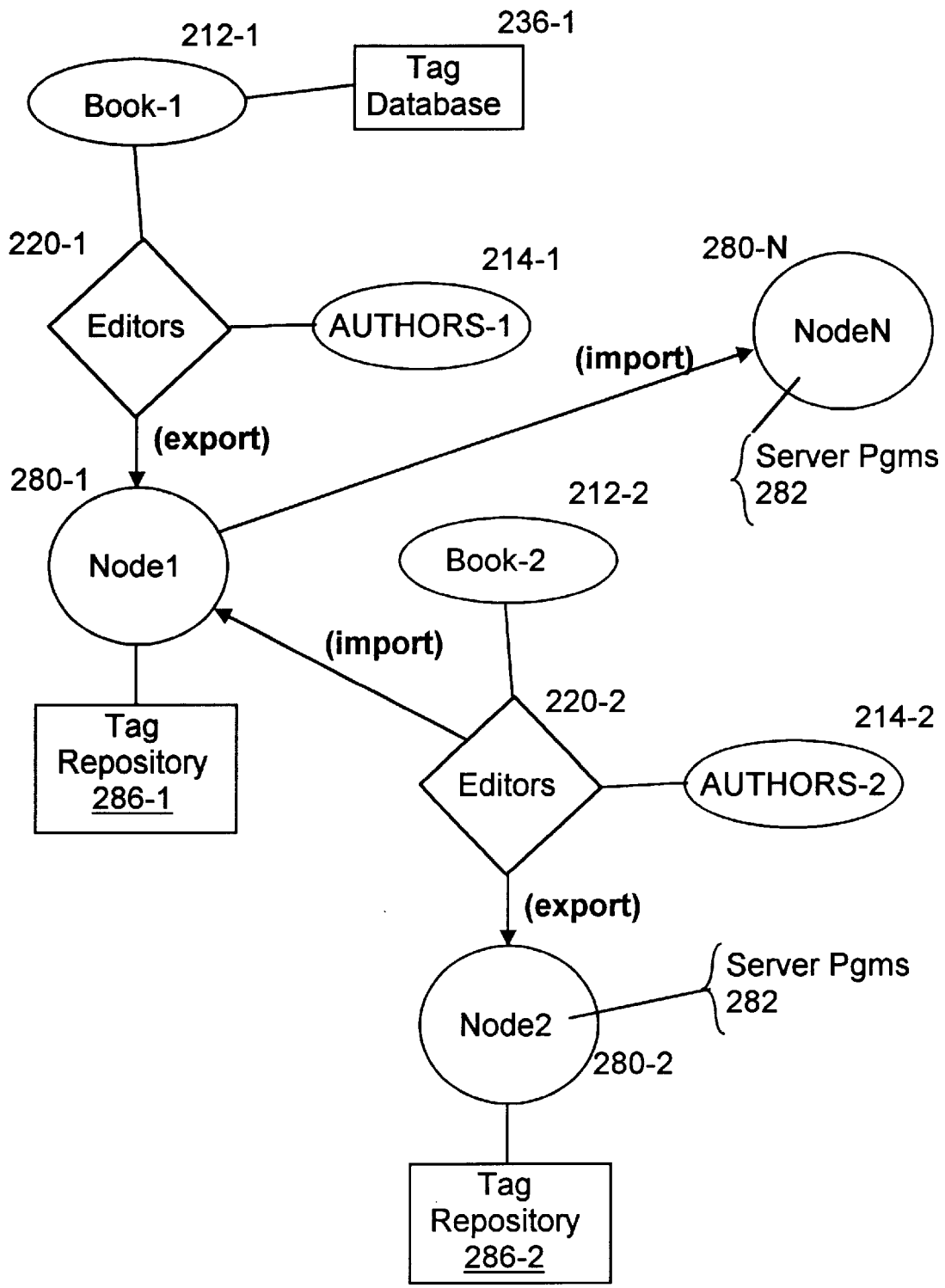
FIG. 3 is a block diagram of a preferred embodiment of the present invention that employs a distributed tag repository.

Referring to FIG. 3, there is shown a document preparation system wherein the tag repository is distributed over several networked nodes 280. In this system sets of authors 214 employ respective editors 220 to create and edit a respective book 212. The books 212 compose the docset 210. As described in reference to FIG. 2, each time one of the authors 214 updates one of the docunits 218 in the book 212 the tag database 236 is updated by the TagMaker with link information for all of the exportable iunits 222. In this embodiment the information in the tag database 236 is exported to a corresponding tag repository 286 hosted on a respective network node 280. Authors 214 import iunits 222 from different books 212 by issuing TagFind requests. A TagFind request results in the execution of the TagFinder program, which, in this system architecture, is configured to (1) visit each of the distributed tag repositories 286 in search of the desired iunits and (2) return any relevant link information to the requester. In the preferred embodiment, each node 280 that hosts one of the pieces of the distributed tag repository 286 includes server programs 282 that provide access to that piece. These server programs respond to search requests issued by the TagFinder.

Figure 4:
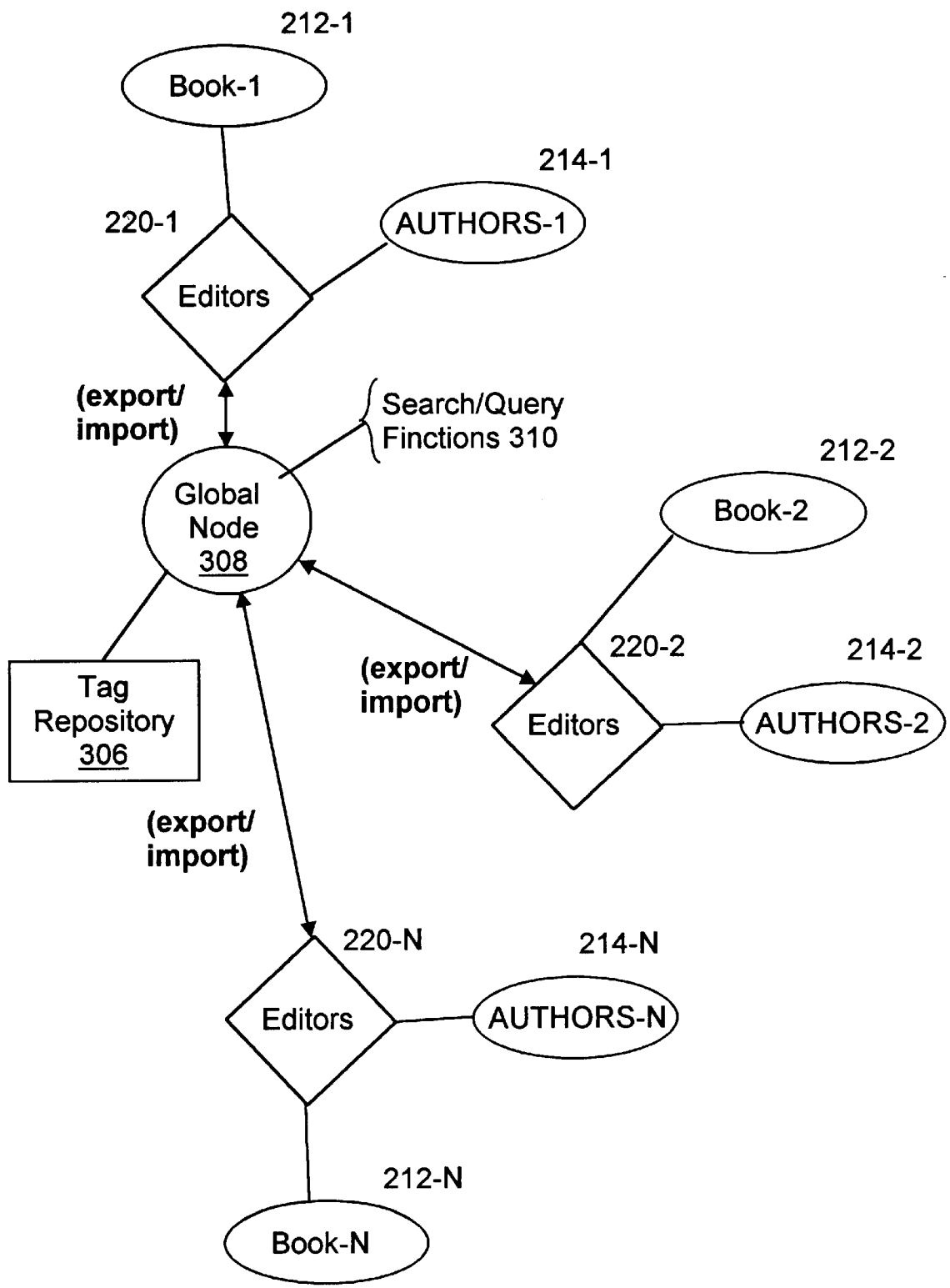
FIG. 4 is a block diagram of a preferred embodiment of the present invention that employs a global tag repository.

Referring to FIG. 4, there is shown a document preparation system wherein the tag repository is implemented as a single, global repository. In the system of FIG. 4 the authors 214 update and edit the docunits composing their respective books 212 as described in reference to FIG. 3. The respective tag databases 236 (not shown) are also updated as described in reference to FIG. 3. All information exported from the tag databases is exported to a central tag repository 306 hosted on a global node 308. The global node 308 is accessible to all authors 214. Preferably, the tag repository 306 is implemented as a database that is accessed using search/query functions 310 provided by the global node 308. The query functions 310 are invoked in response to the TagFind requests issued by the various authors and return links to the authors as described in reference to FIG. 3.

Figure 5:
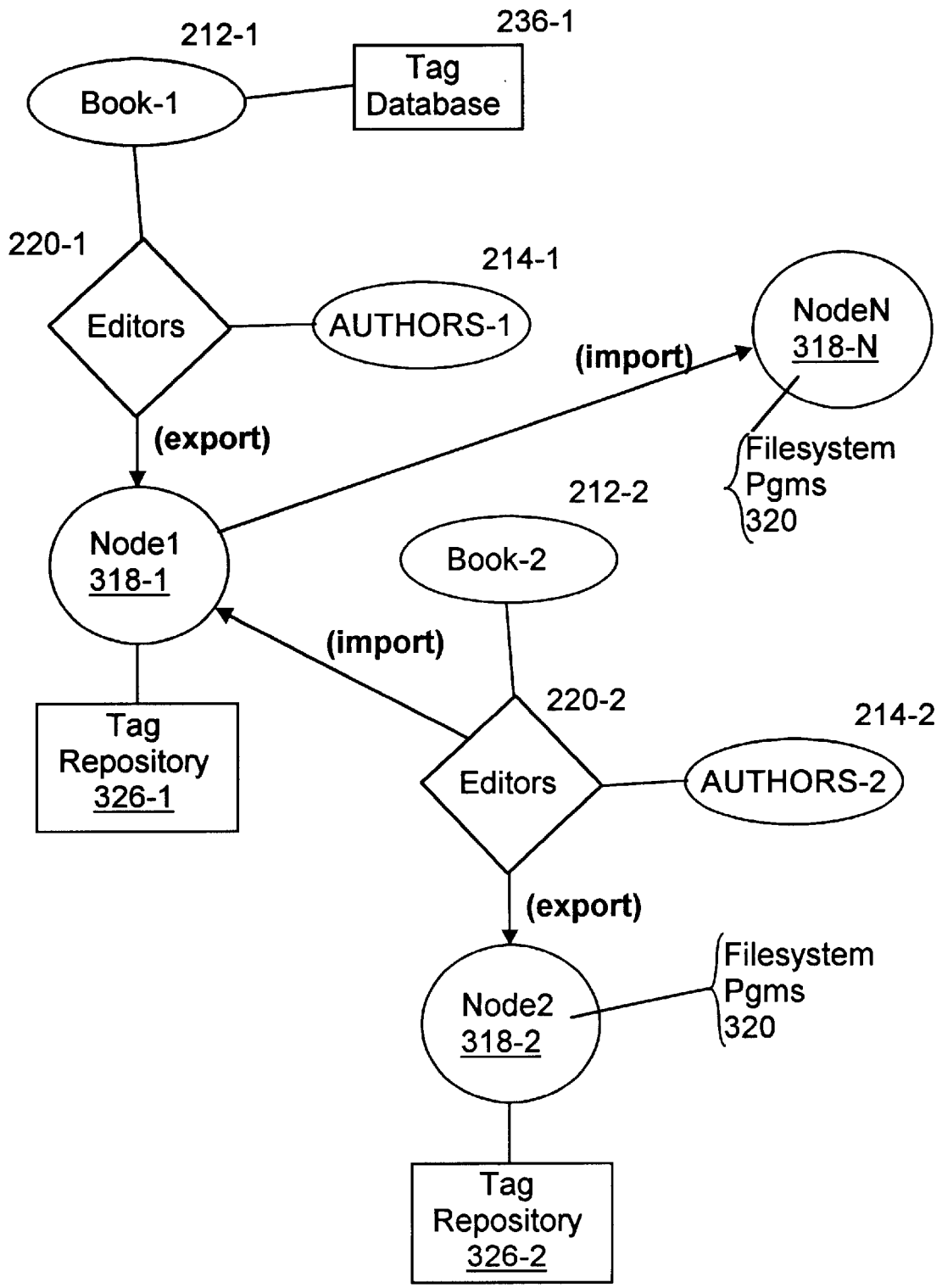
FIG. 5 is a block diagram of a preferred embodiment of the present invention that is implemented on a computer network wherein the nodes are linked and are running a filesystem.

Referring to FIG. 5, there is shown a document preparation system wherein the tag repository is implemented on a computer network whose nodes 318 are linked and are running filesystem software 320. The filesystem 320 may be a global filesystem, such as afs™; an intra-networked filesystem, such as nfs™ or a clustered filesystem. The filesystems generally allow transparent access to any file within their purview and, hence, the iunits or docunits are accessible uniformly to any programs or users. The TagMaker, TagFinder, DocFinder programs, etc. can easily make use of this transparency and can be implemented to access the linked information via normal filesystem operations.

In this system, the books 212 and tag databases 236 are updated and managed as in the embodiments of FIGS. 3 and 4. Tag repository segments 326 are stored as files on the networked nodes 318, some of which also host a respective book 212. Due to the filesystem 320, the iunit information in the repository segments 326 is visible to all authors 214 as separate files in a common, shared directory. An author 214 selects an iunit by simply copying the corresponding file into the target docunit. The TagFinder/DocFinder can search the common, shared directory using any of the file search utilities provided by the filesystem 320. As in the other embodiments, an author who imports an iunit can choose to import the iunit by reference or by inclusion.

Figure 6:
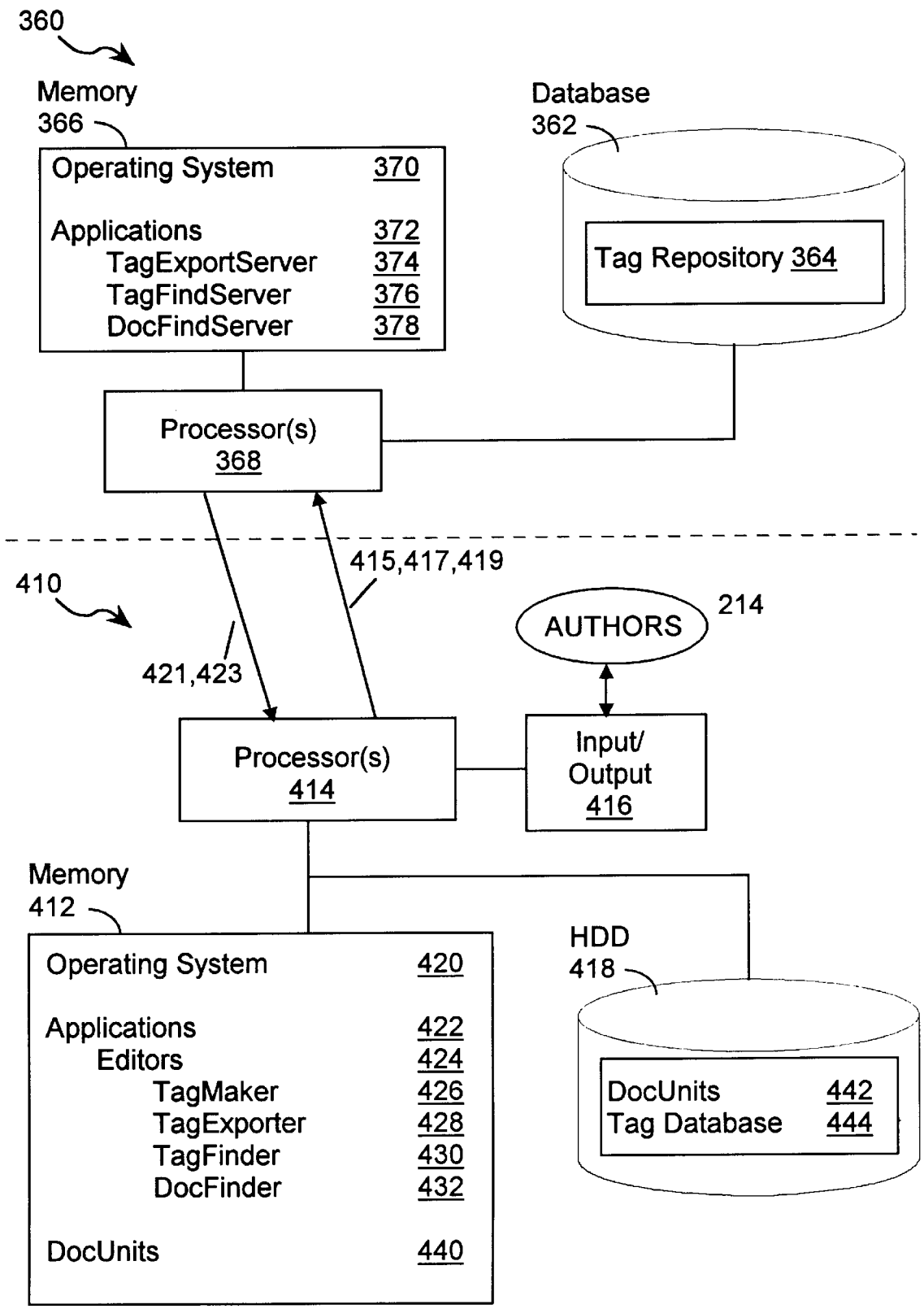
FIG. 6 is a block diagram of a computer system in which the present invention is implemented.

Referring to FIG. 6, there is shown is a block diagram of a computer system in which the present invention is implemented. This system is modeled on the document preparation system of FIG. 4, which incorporates a global tag repository. The dashed line in FIG. 5 separates a computer 360 that hosts the global tag repository 362 from a computer 410 used by a set of authors 214 to create a book 212 and its associated docunits 222.

The computer 410 includes a fast memory (such as a random access memory RAM) 412, one or more processors 414, a user interface 416 and a larger, slower memory (such as a hard disk drive—HDD) 418. In the conventional manner, application programs 422 are executed by the processor 414 in the memory 412 under control of the operating system 420. The application programs 422 include one or more editors 424, each of which, in accordance with the preferred embodiments, incorporate at least a subset of the software support functions prescribed by the present invention. As described above, these software support functions include the TagMaker 426, the TagExporter 428, the TagFinder 430 and the DocFinder 432. The memory 412 also includes at least a portion of any docunit 440 that is being edited using the editor 422.

The HDD 418 permanently stores docunits 442 and, optionally, a local tag database 444. The authors 214 interact with the computer 410 through input/output devices 416.

Given this configuration, anytime a user updates a docunit the editor 424 executes the TagMaker 426, which updates the local tag database 444. When an author executes the TagExporter 428, that program exports information 415 from the tag database 444 to the computer 360. When an author 214 executes the TagFinder 430 or the DocFinder 432, corresponding requests 417, 419 are issued to the computer 360, which returns information regarding the existence of a pointer to the requested iunit or docunit.

The computer 360 includes a memory 366, one or more processors 368 and a database 362 that hosts the tag repository 364. The computer 360 operates conventionally. That is, the processor 368 executes application software 372 in the memory 366 under the control of the operating system 370. The application software 372 includes server routines 374, 376, 378 that enable the computer 360 to respond, respectively, to exported information 415 and TagFind and DocFind requests 417, 419, from the computer 410. The TagExportServer 374 writes the exported information 415 to the tag repository 364 using whatever language is supported by the database 362. The TagFindServer 376 issues database queries to the database 362 to find the iunits specified by the TagFind request 417 and returns link information 421 for those iunits to the computer 410. The DocFindServer 378 issues database queries to the database 362 to find the docunits specified by the DocFind request 419 and returns link information 423 to the computer 410 for those docunits.

The preferred embodiments of FIGS. 3 and 5 are implemented mostly as described above in reference to FIG. 6. Any differences in implementation follow from differences in the respective document preparation system architectures.

For example, the implementation of the embodiment of FIG. 3 is like that of FIG. 4, except that there are a plurality of computers that perform the functions of the computer 360 (FIG. 6). For the embodiment of FIG. 5, in lieu of the TagMakeServer, TagFindServer and DocFindServer programs, the plurality of computers hosting the various tag repositories each run the various programs that constitute the filesystem.

Figure 7:
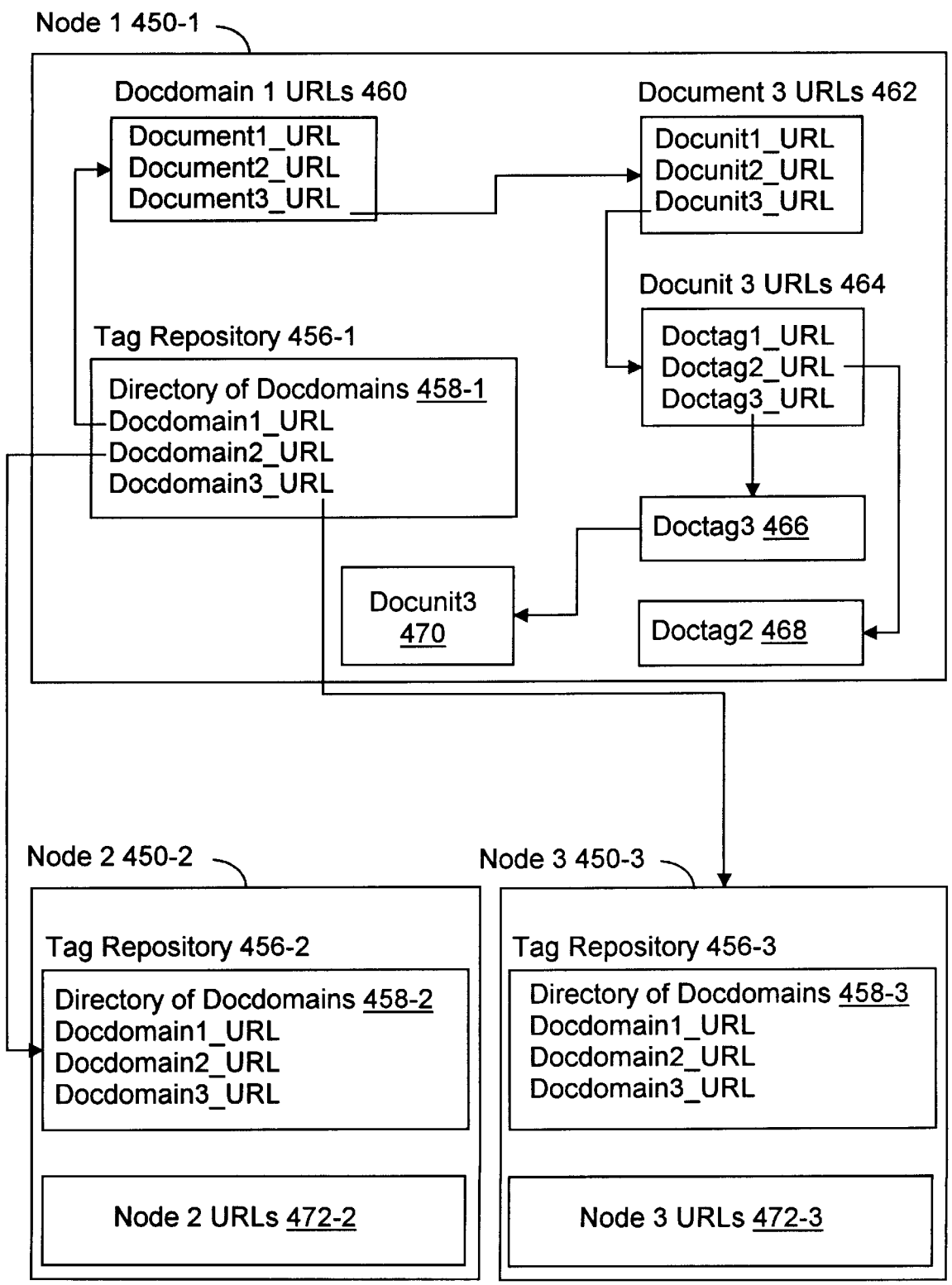
FIG. 7 is a block diagram of a preferred embodiment of the present invention that is implemented on a computer network in which addressing is URL-based and wherein the tags are maintained in HTML files and accessed through Web browsers.

Referring to FIG. 7, there is illustrated another preferred embodiment that employs URLs to export doctags and to import linked information into other documents. This embodiment can be structured similarly to either FIG. 4 or FIG. 5; i.e., it can utilize a distributed or a single tag repository. For the purposes of the present discussion the tag repository is assumed to be distributed. Each docdomain (or book) has a global URL (Docdomain_URL) associated with it at the time the docdomain it is defined. The Docdomain_URL for each docdomain is made well known to all of the docdomains within the docset. Each Docdomain_URL points to a file that lists the URLs (Document_URLs) for each of the documents that compose that docdomain. Each Document_URL in turn points to a file that lists the URLs (Docunit_URLs) for each docunit in that document and each Docunit_URL points to a file that contains one Doctag_URL for each doctag in that docunit.

For example, referring to FIG. 7, there is shown a collection of networked nodes 450-i (i being 1, 2 or 3), each hosting a respective docdomain (note that all of the docdomains could also be hosted on the same node). Each node 450-i includes a tag repository 456-i that includes, among other things, a directory 458 of Docdomain_URLs for all of the docdomans in the docset. In this example the docset includes three docdomains, therefore each tag repository 456 has a directory 458 with three Docdomain_URLs.

The tag repository 456-1 for an exemplary node 1 includes a Docdomain1_URL pointer that points to a top-level file 460 that includes Document_URLs for each of the 3 documents that make up docdomain 1. For example, the Document3_URL points to a file 462 that includes Docunit_URLs for each of the three docunits that make up document 3. Details are shown for the Docunit3_URL from the file 462, which points to a file 464 that includes URLs for each of the three doctags defined in the docunit 3, which are stored as individual files; e.g., the files Doctag3 466 and Doctag2 468. As described above, a doctag file (e.g., Doctag3 466) can include a pointer to its associated docunit (e.g., the Docunit3 470) or can simply include a copy of its linked iunit information (e.g., Doctag2 file 468).

Thus, when the tagmaker is executed, each new doctag is assigned a URL and this URL is added by the tagmaker to the file identified by the Document_URL. Similarly, when a new document is created, the tagmaker adds that document's Document_URL to the file 460 identified by the respective Docdomain_URL.

The Docdomain_URL file 460 contents are kept locally at the site that is the "owner" of that Docdomain. For example, the contents of the Docdomain 1 file 460 are all kept on the node 450-1. The tagmaker does not export any of the tags outside the Docdomain. Instead, other authors reference the contents of a respective Docdomain_URL file by pointing the tagfinder to a corresponding Docdomain_URL. Docdomains are easily located as each distributed site keeps a list of all of the Docdomain URLs corresponding to the docdomains of a particular docset. For example, referring to FIG. 7, all of the tag repositories 456 hold the URLs of the top-level docdomain files, such as the Docdomain URL file 460.

In a preferred embodiment of a document preparation system configured to work with URLs a menu item is provided that invokes the tagfinder. When invoked, the tagfinder shows the contents of the docset hierarchically by accessing each Docdomain_URL and its constituents. This mode of operation can be achieved with conventional Web browsers, which display documents comprising many subdocuments by automatically retrieving each subdocument pointed to by a parent document.

Once a doctag of interest is located, its associated information unit (iunit) can be incorporated in one of two ways into the importing document. Either of these methods can be employed in any of the described embodiments.

In a first method the linked iunit is incorporated by reference. Then, at the time of printing, or when an index or cross reference listing is to be generated for the document, the doctag reference is resolved by the document preparation system software and the actual iunit value (as defined in the doctag) is pulled into the document to replace the reference for an appropriate duration. In other words, if the document preparation system is generating a cross reference listing, it merely uses the value without inserting it into the document. On the other hand, if the document preparation system is printing the document using a postscript process, it would incorporate the iunit value in the corresponding postscript file but not the source document.

In a second method the linked iunit is incorporated by copying the iunit value into the document itself. In this case the reference is resolved and the value in the iunit property-value pair replaces the reference in the document. In this embodiment if the iunit is updated the copy is unaffected. The only way such a copy can be updated is if the importing user runs an automatic tag update function, in which case some or all of the linked iunit values are updated as appropriate.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method performed on a computer for linking data in a document set including a plurality of books, comprising the steps of;

tagging an information unit (iunit) from a first book with a tag that provides information about the iunit that includes a semantic attribute and a unique identifier;

exporting the tag to a tag repository; and selecting the tag from the tag repository to request importation of the iunit to a second book.

2. The method of claim 1, wherein the exporting step is only performed by an author of the first book.

3. The method of claim 1, wherein the semantic information comprises a meaningful description provided by an author of the first book, the semantic information being viewable and searchable in the tag repository to enable an iunit of a desired semantic type to be selected for importation in the selecting step.

4. The method of claim 3, wherein each book has a respective set of authors and comprises a self-contained unit of document administration.

5. The method of claim 4, wherein each book comprises at least one document, each including one or more document units.

6. The method of claim 5, wherein each document unit corresponds to a respective computer file.

7. The method of claim 6, wherein the identifier uniquely identifies the document unit, document and book with which the iunit is associated.

8. The method of claim 7, wherein the tag is stored in a doctag file addressed by an associated doctag URL; such that the iunit is accessed for importation to the second book via the doctag URL.

9. The method of claim 8, wherein the doctag file is stored on a network node that hosts the first book.

10. The method of claim 9, wherein the network node comprises:
a set of document URLs;
each of the document URLs being associated with a respective document within the first book and identifying a second file including a list of docunit URLs, each of which is associated with a respective docunit included within the respective document; and
each of the docunit URLs identifying a respective third file including a list of the doctag URLs associated with respective doctag files included within the respective docunit.

11. The method of claim 10, wherein:
the tag repository comprises a list of domain URLs, each identifying a respective fourth file including the set of document URLs associated with documents composing a corresponding book within a document set; and
the network node comprises:
one copy of the tag repository; and
the second, third, and fourth files associated with the book hosted on that node.

12. The method of claim 7, wherein the iunits associated with a particular book are stored across at least one networked node.

13. The method of claim 4, wherein the tag repository comprises a single, global tag repository stored on a single computer.

14. The method of claim 4, wherein:
the tag repository is distributed across a plurality of networked nodes;
the exporting step comprises exporting tags for a particular book to a respective tag repository located on a predetermined node; and
the selecting step comprises selecting relevant tags from among all of the tag repositories.

15. The method of claim 4, wherein:
the tag repository is distributed across a plurality of networked nodes running a filesystem;
the exporting step comprises creating a common, shared directory including the tags for all of the books; and
the selecting step comprises selecting relevant tags from the common directly using utilities provided by the filesystem.

16. The method of claim 4, further comprising the step of:
updating a respective tag database for the book every time the book is updated; wherein the updating step comprises writing new entries to the tag database for each new tagged iunit and updating existing entries in the tag database as required;
wherein the exporting step comprises exporting information about new and updated entries in the tag database to the tag repository.

17. The method of claim 16, wherein the selecting step comprises:
accessing, upon request of an author of the second book, all tag repositories associated with the document set; and
selecting tags from the accessed tag repositories corresponding to the iunits to be imported from the first book.

18. The method of claim 17, further comprising the step of importing the iunit into the second book.

19. The method of claim 18, wherein the step of importing the iunit is selected from importing the iunit by reference or importing the iunit by inclusion.

20. A computer based band system for linking data in a document set including a plurality of books, comprising:
a tag that provides information about an information unit (iunit) from a first book, including a semantic attribute and a unique identifier;
a tagexporter configured to export the tag to a tag repository; and
a tagfinder configured to select the tag from the tag repository and import the iunit to a second book.

21. The system of claim 20, wherein the tagexporter is controlled only by an author of the first book.

22. The system of claim 21, wherein the semantic information comprises a meaningful description provided by an author of the first book, the semantic information being viewable and searchable in the tag repository to enable an iunit of a desired semantic type to be selected for importation in the selecting step.

23. The system of claim 22, wherein each book has a respective set of authors and comprises a self-contained unit of document administration.

24. The system of claim 23, wherein each book comprises at least one document, each including one or more document units.

25. The system of claim 24, wherein each document unit corresponds to a respective computer file.

26. The system of claim 25, wherein the identifier uniquely identifies the document unit, document and book with which the iunit is associated.

27. The system of claim 26, wherein the tag is stored in a doctag file with an associated doctag URL; such that the tagfinder is configured to access the identifier for importation of the iunit into the second book via the doctag URL.

28. The system of claim 27, wherein the doctag file is stored on a network node that hosts the first book.

29. The system of claim 28, wherein the network node comprises:
a set of document URLs;
each of the document URLs being associated with a respective document within the first book and identifying a second file including a list of docunit URLs, each of which is associated with a respective docunit included within the respective document; and
each of the docunit URLs identifying a respective third file including a list of the doctag URLs associated with respective doctag files included within the respective docunit.

30. The system of claim 29, wherein:
the tag repository comprises a list of domain URLs, each identifying a respective fourth file including the set of document URLs associated with documents composing a corresponding book; and
the network node comprises:
one copy of the tag repository; and
the second, third, and fourth files associated with the book hosted on that node.

31. The system of claim 26, wherein the iunits associated with a particular book are stored across at least one networked node.

32. The system of claim 23, wherein the tag repository comprises a single, global tag repository stored on a single computer.

33. The system, of claim 23, wherein:
- the tag repository is distributed across a plurality of networked nodes;
- the tagexporter is configured to export tags for a particular book to a respective tag repository located on a predetermined node; and
- the tagfinder is configured to select relevant tags from among all of the tag repositories.

34. The system of claim 23, wherein:
- the tag repository is distributed across a plurality of networked nodes running a filesystem;
- the tagexporter is configured to create a common, shared directory including the tags for all of the books; and
- the tagfinder is configured to select relevant tags from the common directly using utilities provided by the filesystem.

35. The system of claim 23, further comprising:
- a tagmaker configured to update a respective tag database for the book every time the book is updated by writing new entries to the tag database for each new tagged iunit and updating existing entries in the tag database as required;
- wherein the tagexporter is configured to export information about new and updated entries in the tag database to the tag repository.

36. The system of claim 35, wherein the tagfinder is configured to:
- access, upon request of an author of the second book, all tag repositories associated with the document set; and
- select tags from the accessed tag repositories corresponding to the iunits to be imported from the first book.

37. The system of claim 36, wherein the tagfinder is further comprising an importer configured to import the iunit into the second book.

38. The system of claim 37, further comprising an importer configured to import the iunit in a manner selected from by reference or by inclusion.

39. A network system for linking data in a document set including a plurality of books, comprising:
- a plurality of networked nodes on which the books are stored; and
- a network tag repository accessible to the networked nodes;
- each of the networked nodes including:
    - a set of tags, each providing information about a respective information unit (iunit) from a first book stored on that node;
    - a tagexporter configured to export at least a subset of the tags to the network tag repository; and
    - a tagfinder configured to select from the network tag repository a second set of tags, each providing information about a respective iunit from a second book, and, based on the second set of tags, to import the respective iunits from the second book into any of the books stored on that node.

* * * * *